United States Patent
Zuniga et al.

(10) Patent No.: US 8,385,732 B2
(45) Date of Patent: Feb. 26, 2013

(54) IMAGE STABILIZATION

(75) Inventors: Oscar Zuniga, Fort Collins, CO (US); Shane D Voss, Fort Collins, CO (US); Jason Yost, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/194,027

(22) Filed: Jul. 29, 2011

(65) Prior Publication Data

US 2013/0027775 A1 Jan. 31, 2013

(51) Int. Cl.
*G03B 17/00* (2006.01)
*H04N 5/228* (2006.01)

(52) U.S. Cl. ............ 396/52; 396/153; 348/208.3

(58) Field of Classification Search ........ 396/52, 396/153; 348/208.3
See application file for complete search history.

(56) References Cited

U.S. PATENT DOCUMENTS

| | | | |
|---|---|---|---|
| 5,999,651 A * | 12/1999 | Chang et al. ............ | 382/215 |
| 6,510,244 B2 | 1/2003 | Proesmans et al. | |
| 6,711,293 B1 | 3/2004 | Lowe | |
| 6,917,692 B1 * | 7/2005 | Murching et al. ......... | 382/103 |
| 7,440,008 B2 | 10/2008 | Lai et al. | |
| 7,548,659 B2 | 6/2009 | Ofek et al. | |
| 2007/0002146 A1 * | 1/2007 | Tico et al. ............ | 348/208.1 |
| 2009/0066800 A1 | 3/2009 | Wei | |
| 2009/0123082 A1 | 5/2009 | Atanssov et al. | |
| 2010/0092093 A1 | 4/2010 | Akatsuka et al. | |
| 2010/0157070 A1 | 6/2010 | Mohanty et al. | |
| 2010/0239172 A1 | 9/2010 | Akiyama | |
| 2011/0038540 A1 | 2/2011 | Ahn et al. | |
| 2011/0085049 A1 | 4/2011 | Dolgin et al. | |

OTHER PUBLICATIONS

Bay, et al. SURF: Speeded up robust features. In ECCV, 2006.
Buehler, C., et al. Non-Metric Image-Based Rendering for Video Stabilization. IEEE Computer Vision and Pattern Recognition Conference. vol. 2. pp. 609-614. Dec. 2001.
Ikemura, et al. Real-Time Human Detection Using Relational Depth Similarity Features. Dept. of Computer Science, Chubu University.
Litvin, et al. Probablistic video stabilization using kalman filtering and mosaicking. ECE Department. Boston University. Boston, MA 02215.
Liu, et al. Content Preserving Warps for 3D Video Stabilization. ACM Transactions on Graphics. Article No. 44, 2009.
Lowe, D.G. Distinctive Image Features from Scale Invariant Keypoints. International Journal of Computer Vision. 60 (2): 91-110. 2004.
Matsushita, et al. Full-frame video stabilization with motion inpainting. IEEE Transactions on Pattern Analysis and Machine Intelligence, pp. 1150-1163. 2006.
Ratakonda, K. Real-Time digital video stabilization for multi-media applications. Dept. of Electrical and Computer Engineering. University of Illinois. 1998. IEEE.

* cited by examiner

*Primary Examiner* — Clayton E Laballe
*Assistant Examiner* — Noam Reisner
(74) *Attorney, Agent, or Firm* — Erik Anderson

(57) ABSTRACT

Example embodiments disclosed herein relate to image stabilization. Image stabilization includes techniques used to reduce jitter associated with the motion of a camera. Image stabilization can compensate for pan and tilt (angular movement, equivalent to yaw and pitch) of a camera or other imaging device. Image stabilization can be used in still and video cameras, including those found in mobile devices such as cell phones and personal digital assistants (PDAs).

20 Claims, 13 Drawing Sheets

$$f_{xx} = [1 \underbrace{0 \cdots 0}_{\text{(N-1) ZEROS}} -2 \underbrace{0 \cdots 0}_{\text{(N-1) ZEROS}} 1]$$

$$f_{yy} = [1 \underbrace{0 \cdots 0}_{\text{(N-1) ZEROS}} -2 \; 0 \cdots 0 \; 1]^T$$

WHERE T INDICATES A TRANSPOSITION OF THE KERNEL $$f_{xy} = \begin{bmatrix} 1 & 0 & \cdots & 0 & -1 \\ 0 & & & & 0 \\ \vdots & & & & \vdots \\ 0 & & & & 0 \\ -1 & 0 & \cdots & 0 & 1 \end{bmatrix} \begin{matrix} \text{(N-1) ROWS} \\ \text{OF ZEROS} \end{matrix}$$

(N-1) COLUMNS OF ZEROS

FIG. 15 ns and personal digital assistants (PDAs). With still cameras, movement or shake is particularly problematic at slow shutter speeds in lower lighting conditions. With video cameras, movement or shake causes visible frame-to-frame jitter in the recorded video.

IMAGE STABILIZATION

BACKGROUND

A challenge exists to deliver quality and value to consumers, for example, by providing mobile devices, such as cell phones and personal digital assistants, that are cost effective. Additionally, businesses may desire to provide new features to such mobile devices. Further, businesses may desire to enhance the performance of one or more components of such mobile devices.

BRIEF DESCRIPTION OF THE DRAWINGS

The following detailed description references the drawings, wherein:

FIG. 15 shows an example of kernels for computing second-order partial derivatives.

DETAILED DESCRIPTION

Figure 1:
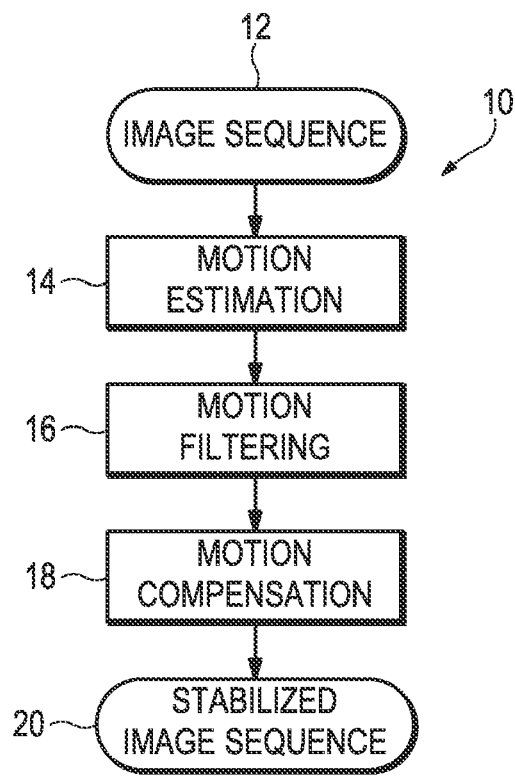
FIG. 1 shows block diagram of an example of an image stabilization method.

Image stabilization includes techniques used to reduce jitter associated with the motion of a camera. It can compensate for pan and tilt (angular movement, equivalent to yaw and pitch) of a camera or other imaging device. It can be used in still and video cameras, including those found in mobile devices such as cell phones and personal digital assistants (PDAs). With still cameras, movement or shake is particularly problematic at slow shutter speeds in lower lighting conditions. With video cameras, movement or shake causes visible frame-to-frame jitter in the recorded video.

The quality of image stabilization depends in large part on two factors. First, the camera motion needs to be modeled and measured accurately. Second, the image stabilization technique needs to be able to distinguish between which part of the motion is intended and should be preserved and which part of the motion should be filtered out as unintended motion in order to produce a smooth result that is visually free from camera shake.

Solutions for image stabilization can generally be classified as either two-dimensional (2D) or three-dimensional (3D) according to the motion model that is used. Some 3D solutions may use Structure Form Motion algorithms to recover both the 3D camera motion and the 3D scene structure. This information can then be used to synthesize views as seen from a smooth camera trajectory. Such techniques can produce high quality results, but are computationally expensive and often lacking in robustness.

Two-dimensional techniques model the effect of camera motion on the imaged scenes as a 2D transform or homography (affine or perspective) between adjacent frames. These models are accurate if the scene is planar or if the camera motion consists only of rotations around an optical axis. Two-dimensional image stabilization techniques offer a better balance between performance, quality, and robustness than 3D image stabilization techniques. Two-dimensional techniques have a motion estimation component that needs to be carefully designed for accuracy while still enabling real-time performance. Image stabilization techniques that utilize direct or intensity-based motion estimation, such as optical flow or gradient descent searching, are often too expensive for real-time performance. Project profile correlation techniques can offer real-time performance in mobile devices, but have a lower accuracy and can typically model only translation instead of a more complete affine motion. Image stabilization techniques that utilize feature-based motion estimation typically use multi-scale methods such as scale invariant feature transform (SIFT) or speeded up robust features (SURF) which still tend to be short of real time performance.

Many image stabilization techniques are thus too computationally expensive for real time performance in mobile device applications. Other image stabilization techniques fall short of the accuracy required in such devices. A significant challenge and need therefore exist to accomplish image stabilization in a mobile device with real-time performance and accuracy (e.g., 30 frames per second (fps)).

A block diagram of an example of an image stabilization method 10 is shown in FIG. 1. Method 10 may be utilized on a sequence of frames or images 12 that may include still images or video images. As can be seen in FIG. 1, method 10 includes three stages: a motion estimation module or component 14, a motion filtering module or component 16, and a motion compensation module or component 18, each of which are described in more detail below. As shown in FIG. 1, the output of method 10 is a stabilized image sequence 20 that may include still images or video images.

Briefly, motion estimation module or component 14 determines the amount of motion occurring between an original frame and an adjacent frame in a sequence. This may be accomplished in a variety of ways including feature based image registration. Motion filtering module or component 16 analyzes the measured motion history and determines which component of the absolute motion needs to be preserved as intended motion and which component needs to be eliminated or filtered out. Motion compensation module or component 18 renders a new frame as a warped version of the original image frame to remove the unintended motion.

Figure 2:
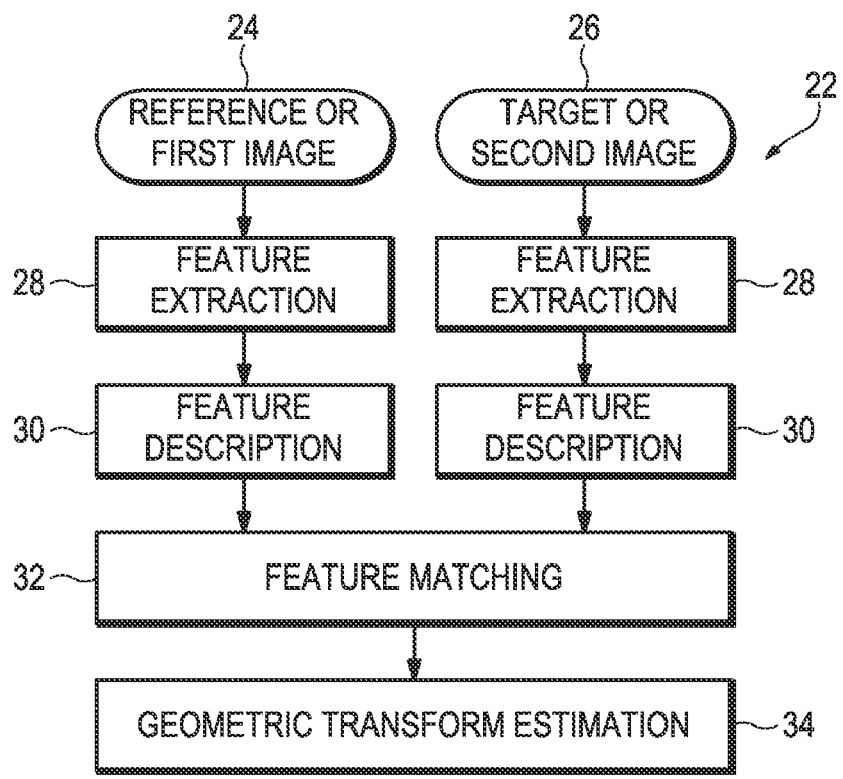
FIG. 2 shows a block diagram of an example of a feature based image registration method.

A block diagram of an example of a feature based image registration method 22 is shown in FIG. 2. As can be seen in FIG. 2, method 22 includes several modules or components to which both reference or first image 24 and target or second image 26 of a sequence are input. Method 22 includes a feature extraction component 28 that operates on both first image 24 and second image 26. As will be discussed in more detail below, feature extraction component 28 detects key points or salient features in reference image 24 and target image 26. Method 22 also includes a feature description module 30 that operates on both reference or first image 24 and target or second image 26. As will be also discussed in more detail below, feature description module 30 extracts a feature descriptor for each key point of reference or first image 24 and each key point of target or second image 26 that includes a small image patch centered around each such key point.

Method 22 additionally includes a feature matching component 32 that additionally operates on both first image 24 and second image 26. As will be additionally discussed in more detail below, feature matching component 32 selects pairs of key points for each of first image 24 and second image 26 based on a measure of closeness of their feature descriptors. Method 22 further includes a geometric transform estimation module 34. As will be further discussed below in more detail, geometric transform estimation module 34 utilizes a list of matching pairs of key points selected by feature matching module 32 and the positions of such key points to map reference image 24 into target image 26.

Figure 3:
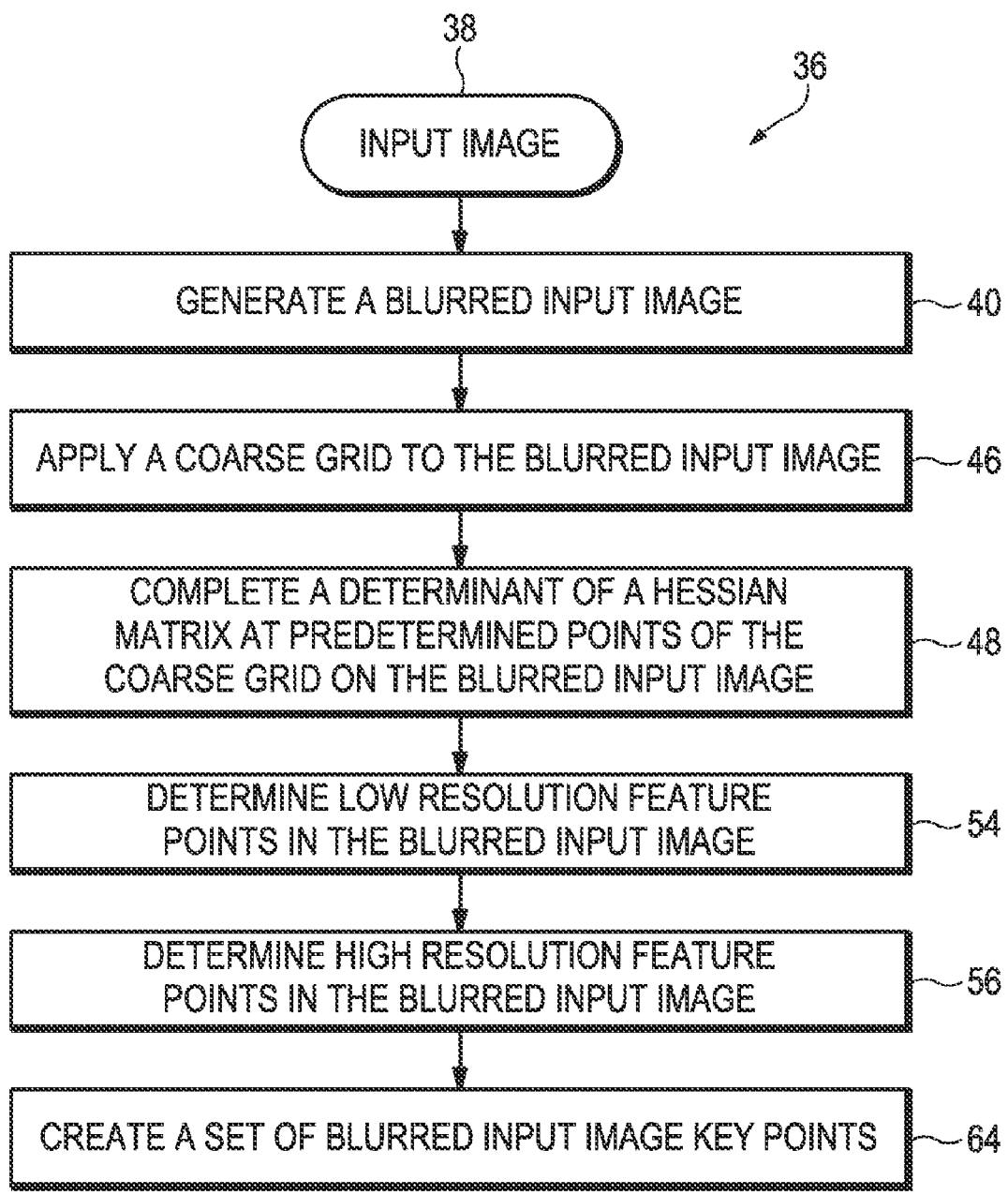
FIG. 3 shows a block diagram of an example of a feature extraction method.

A block diagram of an example of a feature extraction method 36 (for feature extraction component 28) is shown in FIG. 3. Feature extraction method 36 operates on both reference or first image 24 and target or second image 26, which is intended to be represented by the use of input image 38 in FIG. 2. Input image 38 can come from a variety of sources or signals. For example, the luminance channel may be used for YCC images. As another example, the green channel may be used for ROB images. As another example, Bayer images may be directly used as long as the box filter (discussed below) is of size N×N and N is an even number such as 2, 4, 6, 8, etc.

Feature extraction method 36 includes the element or component 40 of generating a blurred input image which involves convolving input image 38 with a two-dimensional box filter to create a box filtered image. The dimensions and size of this box filter can vary. For example, an N×N box filter, where N=8, may be used for video image applications. As another example, an N×N box filter, where N can vary between 8 and 32, may be used for still image applications.

Figure 4:
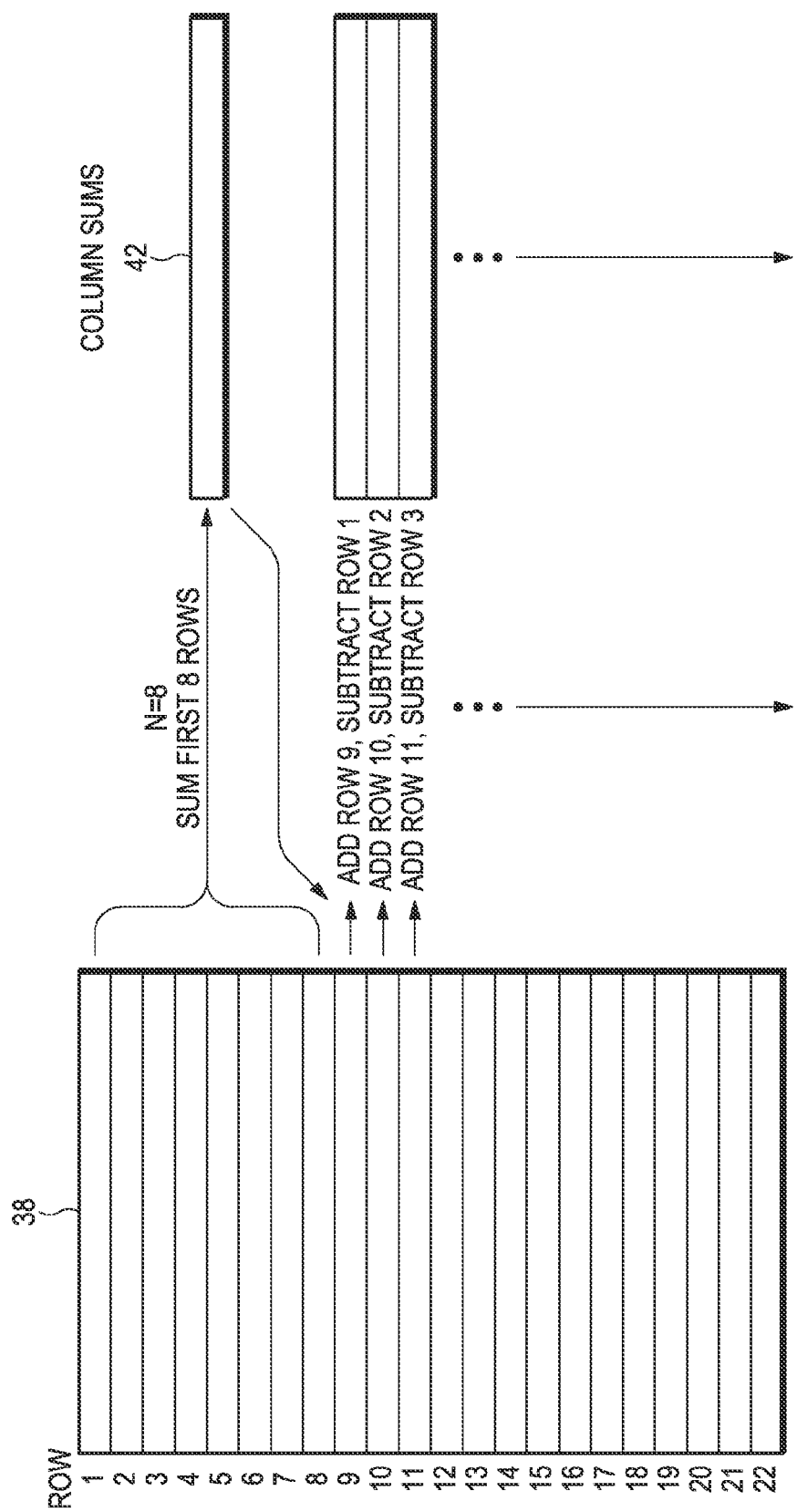
FIGS. 4-6 illustrate an example of the computation of an arbitrary size box filter of N×N.
Figure 5:
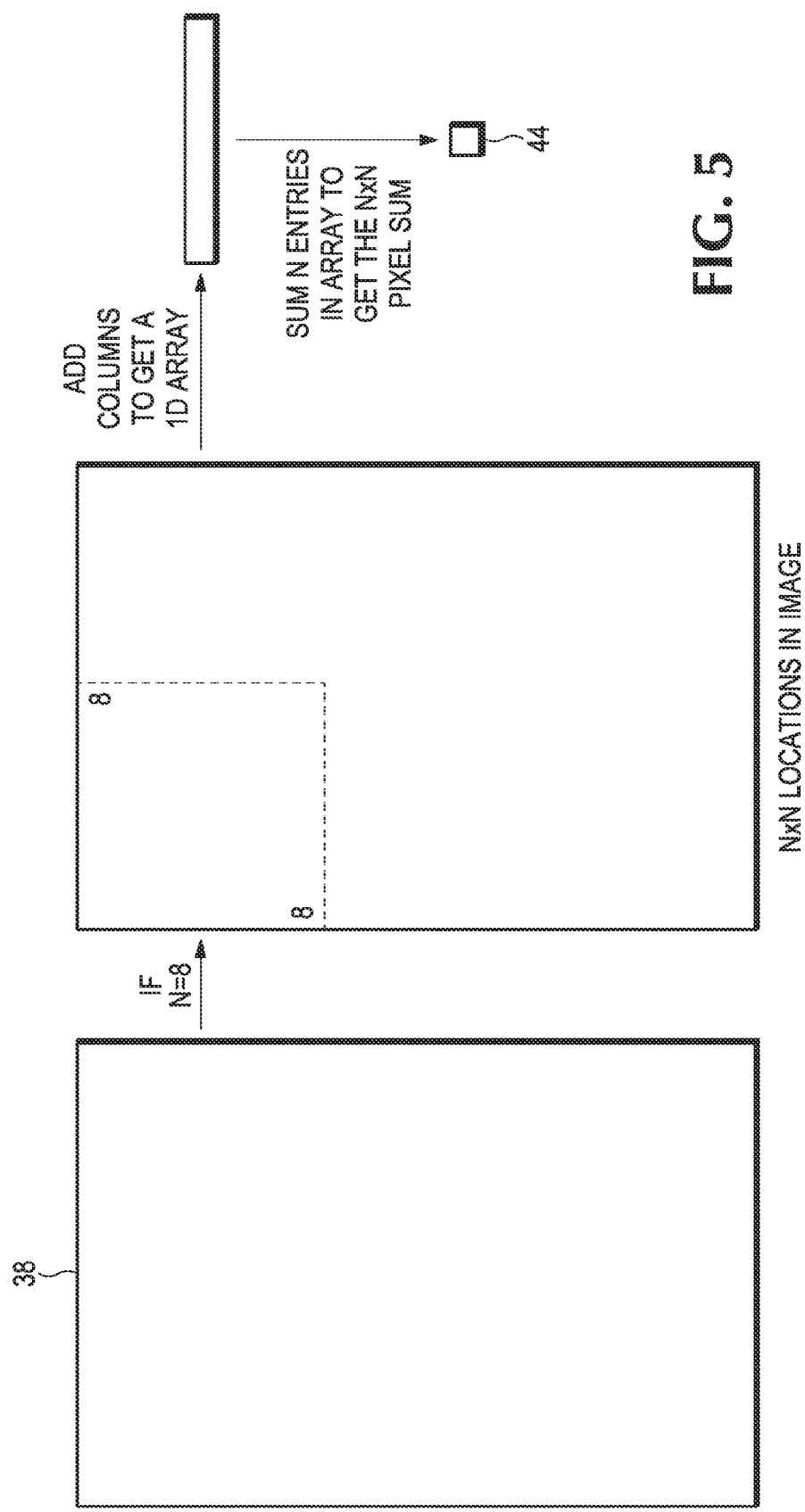
Figure 6:
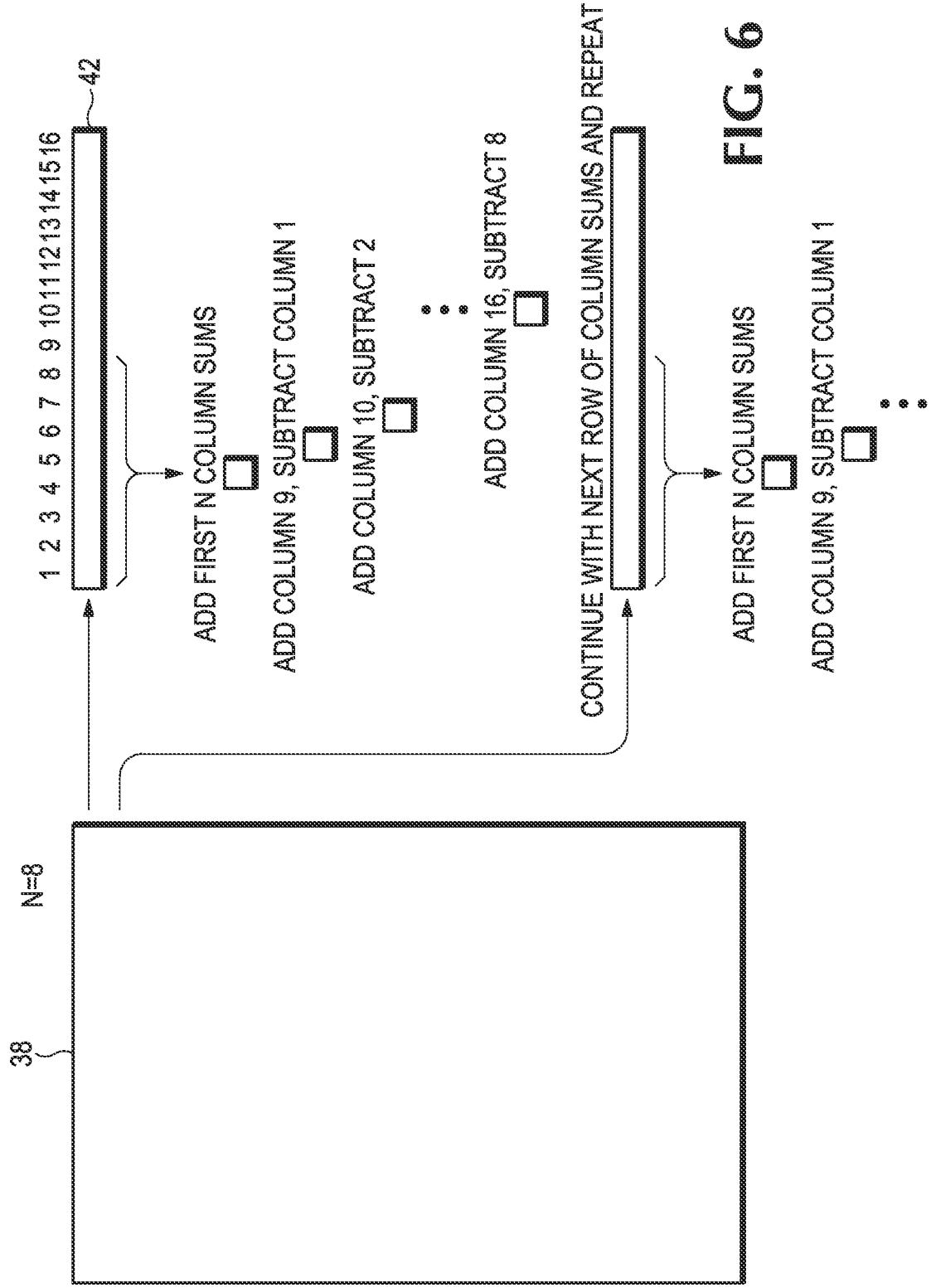

An arbitrary size box filter of N×N can be computed efficiently with only four (4) operations (two (2) adds and two (2) subtracts) per pixel in input image 38. This is done by maintaining a one-dimensional (1D) array 42 which stores the sum of N consecutive image rows, for example the first eight (8) rows, where N=8, as generally illustrated in FIG. 4. As input image 38 is scanned from top to bottom, 1D array 42 is updated by adding a new row (r) and subtracting the previous row (r-N). As generally illustrated in FIG. 5, an initial N×N pixel sum 44 is obtained by adding the first N entries in the 1D array. Scanning 1D array 42 left to right, a new pixel sum is obtained by adding a new column (c) and subtracting the previous column (c-N), as generally illustrated in FIG. 6. Each pixel sum is normalized by dividing by the area of the box. This division can be accomplished efficiently as a bit shift, if N is chosen to be equal to a power of two (2).

Figure 7:
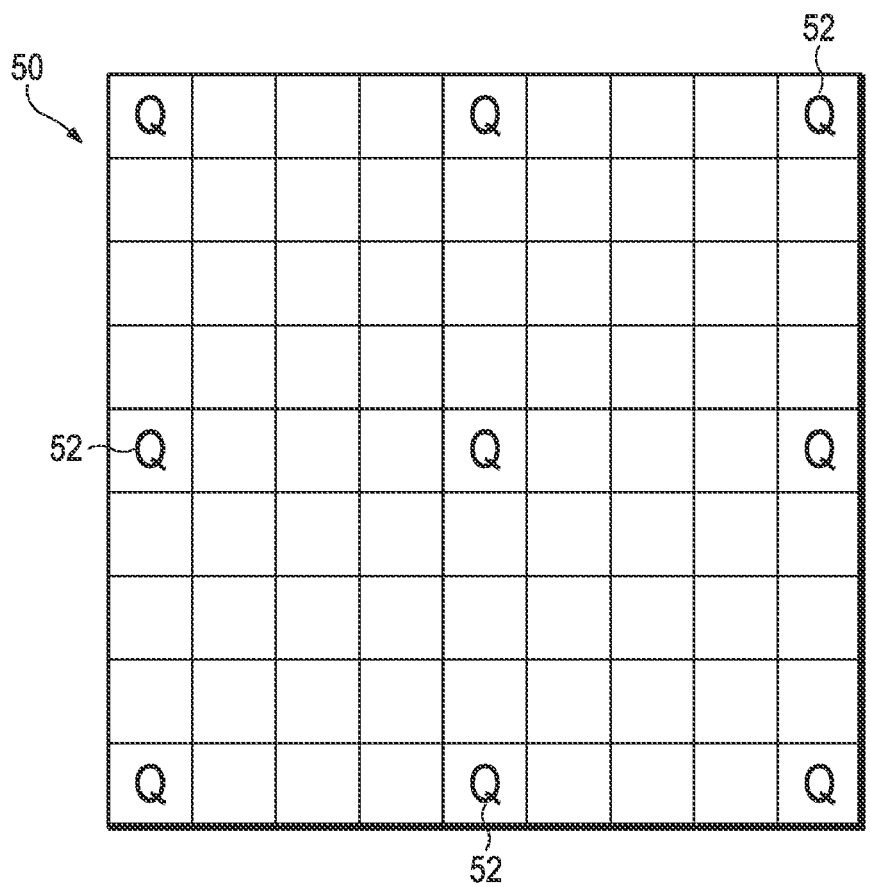
FIG. 7 illustrates an example of a portion of a coarse grid.

Referring again to FIG. 3, feature extraction method 36 also includes the element or component 46 of applying a coarse grid to the blurred input image. Method 36 additionally includes the element or component 48 of computing a determinant of a Hessian matrix at predetermined points of the coarse grid on the blurred input image. An example of a portion of such a coarse grid 50 is shown in FIG. 7, Coarse grid 50 includes a number of points or locations 52 indicated by the letter "Q" in FIG. 7. The pattern of coarse grid 50 is repeated all through the box filtered or blurred input image. What this pattern indicates is the determinant of the Hessian matrix (detH) is initially computed only once for every 4×4 pixels at the locations 52. The Hessian matrix (H) is a square matrix of second-order partial derivatives of a function ($f$). In this example, the Hessian matrix is:

$$H = \begin{bmatrix} fxx & fxy \\ fxy & fyy \end{bmatrix}$$

and the determinant of H is: $detH = f_{xx}f_{yy} - \partial_{xy}$. This means that the determinant of the Hessian matrix (detH) is only computed for $\frac{1}{16}^{th}$ of the blurred input image which increases the speed of method 36. Examples of the kernels $f_{xx}$, $f_{yy}$, and $f_{xy}$ used in computing the second-order partial derivatives are shown in FIG. 15.

Referring again to FIG. 3, method 36 further includes the element or component 54 of determining the low resolution feature points in the blurred input image. These low resolution feature points correspond to those locations 52 having local maxima of deal that exceed a pre-determined image dependent threshold relative to adjacent 3×3 Q neighbors. These feature points have low resolution because the local maxima of detH are computed on coarse grid 50.

The pre-determined image dependent threshold can be calculated as follows. The laplacian of the first input image 38 is computed in coarse grid 50. The laplacian is computed with the kernel:

$$lap = \begin{matrix} 0 & 0 & 1 & 0 & 0 \\ 0 & 0 & 0 & 0 & 0 \\ 1 & 0 & -4 & 0 & 1 \\ 0 & 0 & 0 & 0 & 0 \\ 0 & 0 & 1 & 0 & 0 \end{matrix}$$

This computation is performed only for every $\frac{1}{16}^{th}$ row and every $\frac{1}{16}^{th}$ column. The initial threshold is given by: $ThI = 2 \, sdev(lap_i)$, where sdev is the standard deviation of $lap_i$. Using ThI on detH results in an initial number of feature points. If this is larger than the target, ThI is reduced until the target is reached. This is efficiently done using a histogram of the values of detH, numI represents the initial number of feature points and numT represents the targeted number, then for the next input image 26 the lap is not computed and the initial threshold is computed as: $ThI(k+1) = (0.9 \, numI/NumT) \, ThI(k)$, where $ThI(k+1)$ is the next input image 38 and $ThI(k)$ is the previous input image 38.

Figure 8:
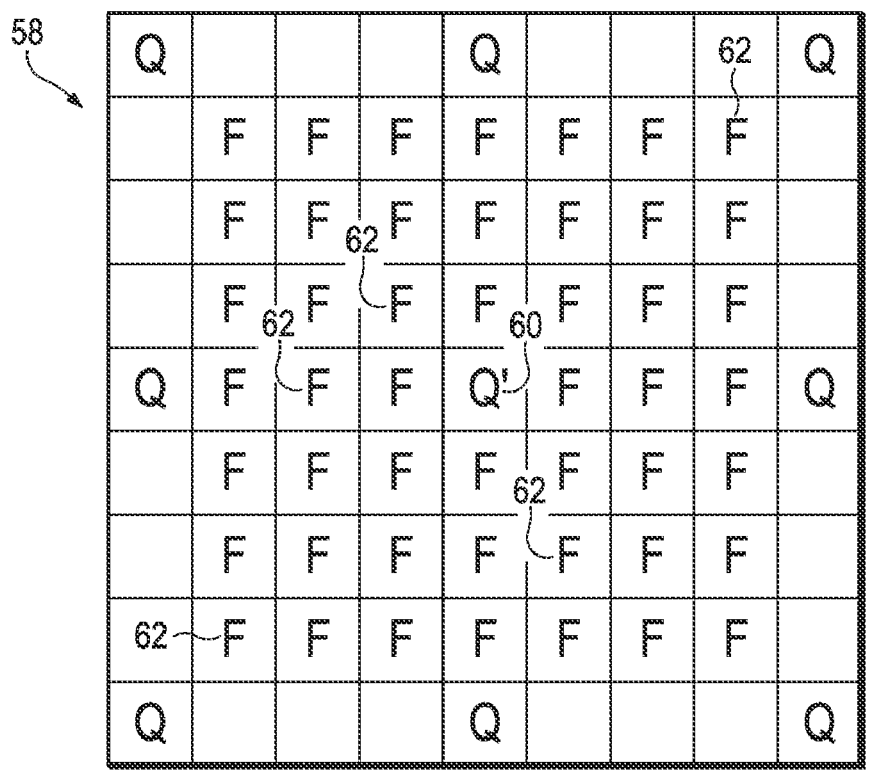
FIG. 8 illustrates an example of a portion of a fine grid.

Method 36 further includes the element or component 56 of determining the high resolution feature points in the blurred input image. This is accomplished by applying a fine grid 58 shown in FIG. 8 around each of the low resolution feature points (Q') 60 determined by element or component 54. The determinant of the Hessian matrix (detH) is then computed at each point or location 62, indicated by an "F" FIG. 8. The maximum value of detH in fine grid 58 defines the final high resolution feature point. As can be seen, fine grid 58 measures 7×7 pixels in the example shown in FIG. 8.

Referring again to FIG. 3, feature extraction method 36 also includes the element or component 64 of creating a set of blurred input image key points. This set is created by selecting a predetermined number of high resolution feature points determined by element or component 56 that have the strongest Hessian matrix determinant values. A histogram of quantized Hessian matrix determinant values of the final high resolution feature points can be used to help facilitate this selection.

Figure 9:
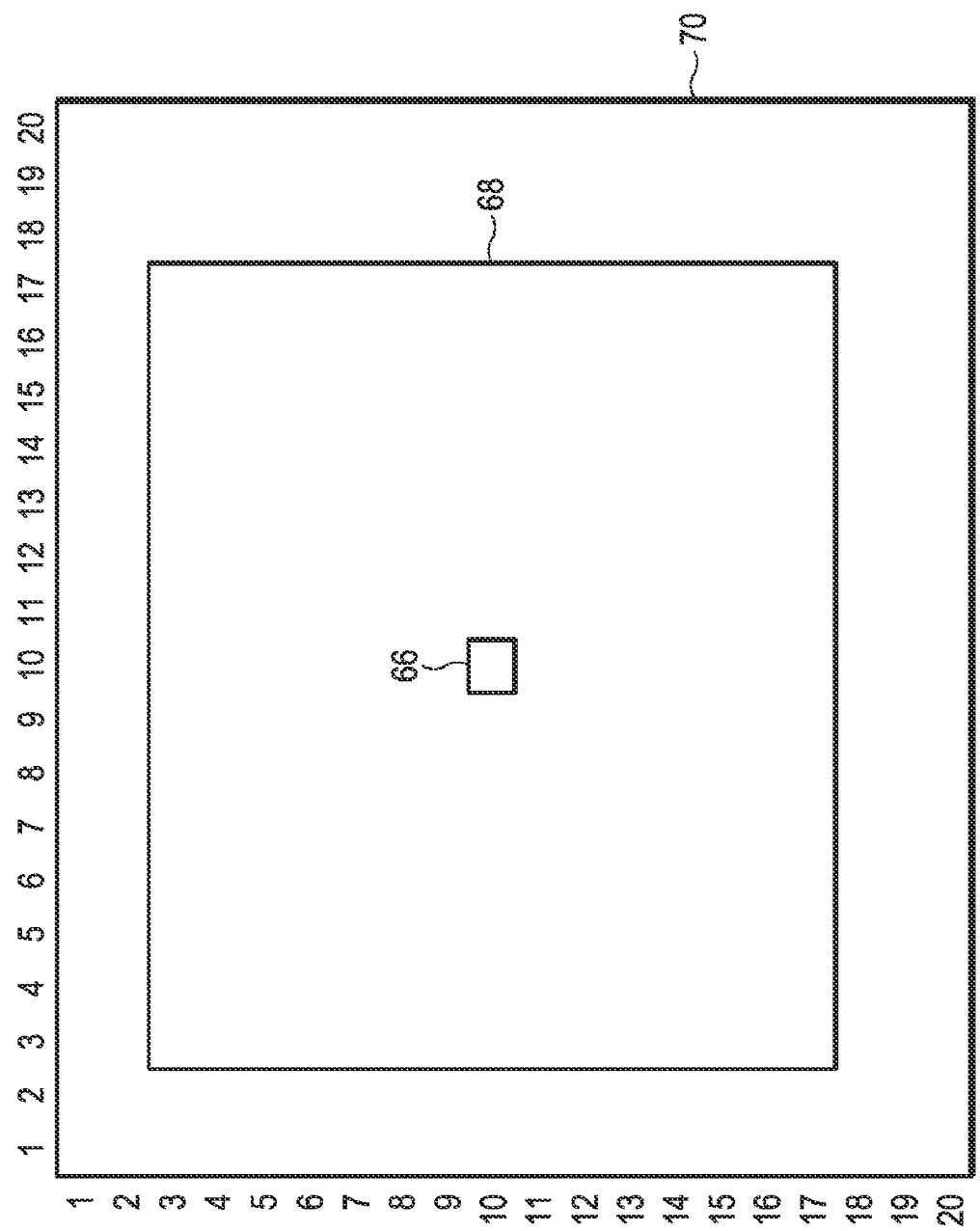
FIG. 9 illustrates an example of a window or patch centered about a feature point in a luminance plane.

Referring again FIG. 2, after completion of feature extraction module 28, feature based image registration method 22 proceeds to feature description module 30. Each of the high resolution feature points 66 created by feature extraction module 28 is assigned a simple descriptor that includes the luminance values in a window or patch 68 centered about such points 66 in image luminance plane 70 shown in FIG. 9. Window or patch 68 has a size of 2N×2N pixels, where represents the size of the box filter N×N used in feature extraction module 28 and component 40 of method 36, as discussed above in connection with FIGS. 2 and 3. N=8 in the example illustrated in FIG. 9, The mean of these luminance values of window or patch 68 is removed or subtracted in order to provide robustness against changes in illumination between first or reference image 24 and second or target image 26.

Figure 10:
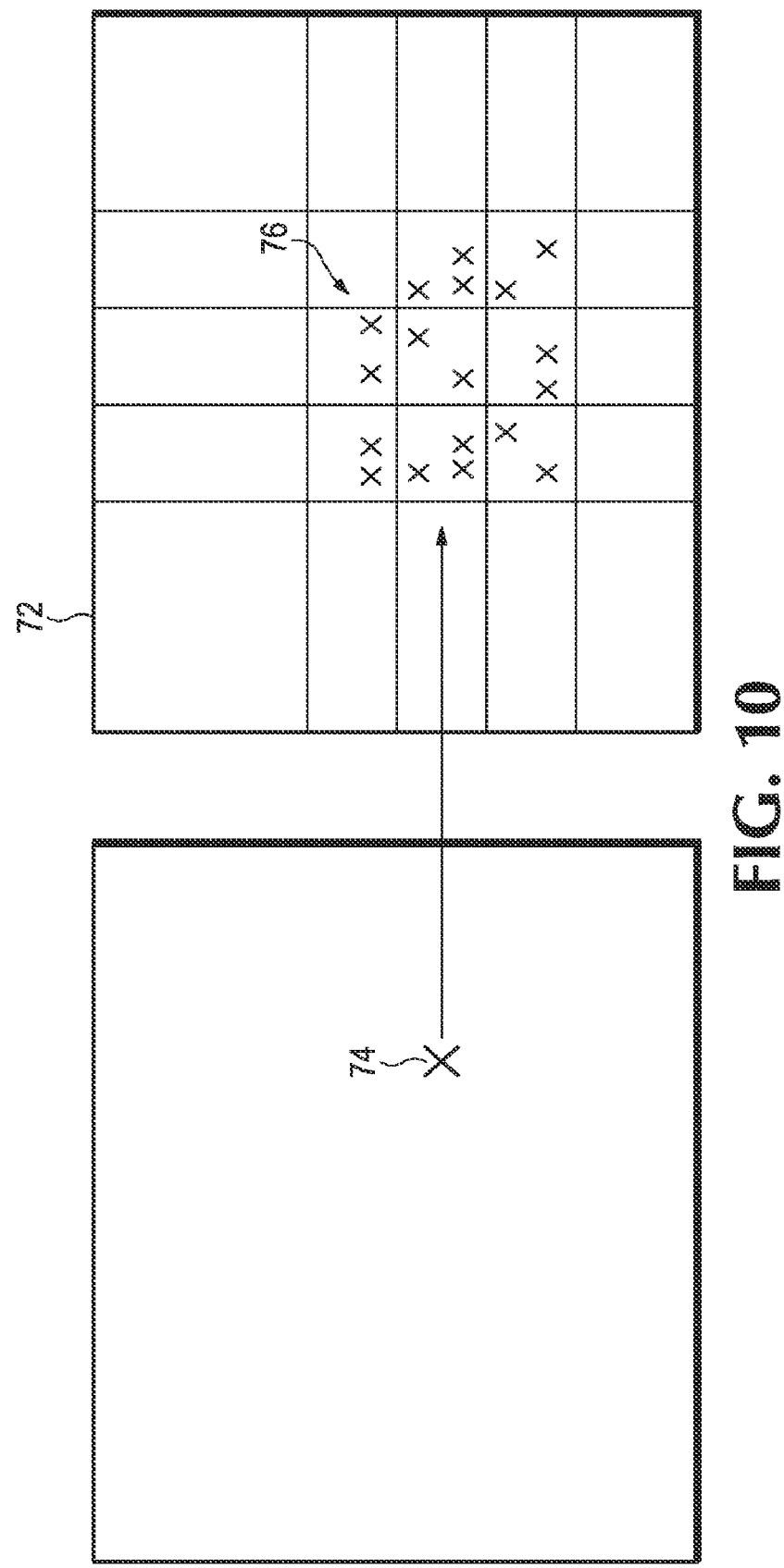
FIG. 10 is an example of a two-dimensional (2D) spatial index.

Referring again FIG. 2, after completion of feature description module 30, feature based image registration method 22 proceeds to feature matching module 32. Feature matching module 32 generates a list of pairs of matching feature points for reference or first image 24 and target or second image 26 created by feature description modules 30. An example of a two-dimensional (2D) spatial index of references 72 like that shown in FIG. 10 is used to avoid an exhaustive comparison of a feature point 74 from first or reference image 24 against every feature point from second or target image 26. Rather, a subset of feature points 76 is used which helps speed up the registration of first or reference image 24 and second or target image 26, Two-dimensional spatial index of references 60 consists of 32×24 tiles spanning the image dimensions. A reference list is generated for each tile consisting of references to all of the feature points which lie on that tile and the adjacent eight (8) neighboring tiles as shown in FIG. 10. Matching is based on a measure of closeness of feature point 74 to the feature points in subset 76. This measure of closeness can be determined by a variety of difference operators including by locating the pair of feature points within these constraints that have the smallest sum of absolute differences (SAD) in their feature descriptors.

Once one or more matching pairs of feature points are determined by feature matching module 32, feature based image registration method 22 proceeds to geometric transform estimation module 34. Module 34 utilizes the matching pairs of feature points and their positions to estimate a global affine transformation that maps first or reference image 24 into second or target image 26. Robustness against outliers is obtained by using either random sample consensus (RANSAC) or M-Estimation. Other approaches (e.g., a robust mean or utilization of the median of the motion vectors defined by matching pairs of feature points) can be used if correction of only translation is required, rather than translation, rotation, scaling and shear. These approaches also tend to be computationally less expensive and faster.

Referring again to FIG. 1, image stabilization method 10 proceeds next to motion filtering module or component 16 after completion of motion estimation module or component 14. Motion filtering module or component 16 performs several operations including: (i) analyzing the determined amount of motion occurring between the original frame and the adjacent frame in the sequence, (ii) determining the intended motion component of the determined amount of motion occurring between the original frame and the adjacent frame in the sequence, and (iii) determining the unintended motion component of the determined amount of motion occurring between the original frame and the adjacent frame in the sequence.

The intended motion may be determined using a Kalman filter on the history of motion parameters. The unintended motion for which compensation is required is determined by subtracting the determined intended motion from the motion determined by module or component 14. A first order kinematic model may be used for Kalman filtering of the cumulative affine motion parameters. The process for obtaining the cumulative affine motion parameters is as follows. Let $dZ_n$ represent the global motion affine transform between image frame (n−1) and image frame (n). In homogeneous coordinates $dZ$, is given by:

$$dZ_n = \begin{bmatrix} da_{11} & da_{12} & da_{13} \\ da_{21} & da_{22} & da_{23} \\ 0 & 0 & 1 \end{bmatrix}$$

The cumulative affine transform from frame 0 to frame n) ea be computed as:

$$Z_n = dZ_n Z_{n-1}$$

with initial condition $Z_0 = I$.

$Z_n$ can also be expressed in homogeneous coordinates:

$$Z_n = \begin{bmatrix} a_{11} & a_{12} & a_{13} \\ a_{21} & a_{22} & a_{23} \\ 0 & 0 & 1 \end{bmatrix}$$

The process for obtaining the cumulative affine motion parameters for translational motion only can be simplified as follows. Let $dz_n$ represent a global translation parameter between frame (n−1) and frame (n). The cumulative parameters from frame 0 to frame (n) can be computed as:

$$z_n = dz_n + z_{n-1}$$

with initial condition $z_0 = 0$.

The first order kinematic model used for Kalman filtering of the cumulative affine motion parameters is as follows. Let $da_n$ represent a sequence of the true intended values of any of the affine transform parameters describing the motion between two adjacent image frames and let $a_n$ represent the cumulative values. The noisy cumulative motion measurements $z_n$ are related to the true intended values by:

$$z_n = H x_n + v_n$$

where $x_n$ represents the state vector $$x_n = \begin{bmatrix} a_n \\ da_n \end{bmatrix}.$$

The matrix H=[1 0] maps the state to the true intended value and $v_n$ represents the measurement noise or unintended motion which is assumed to be normally distributed with zero mean and covariance R.

The filtering process is described by the linear stochastic difference equation:

$$x_n = F x_{n-1} + w_{n-1}$$

where the state transition matrix is given by $$F = \begin{bmatrix} 1 & 1 \\ 0 & 1 \end{bmatrix},$$

and $w_n$ represents the process noise which is assumed to be normally distributed with zero mean and covariance Q.

Figure 11:
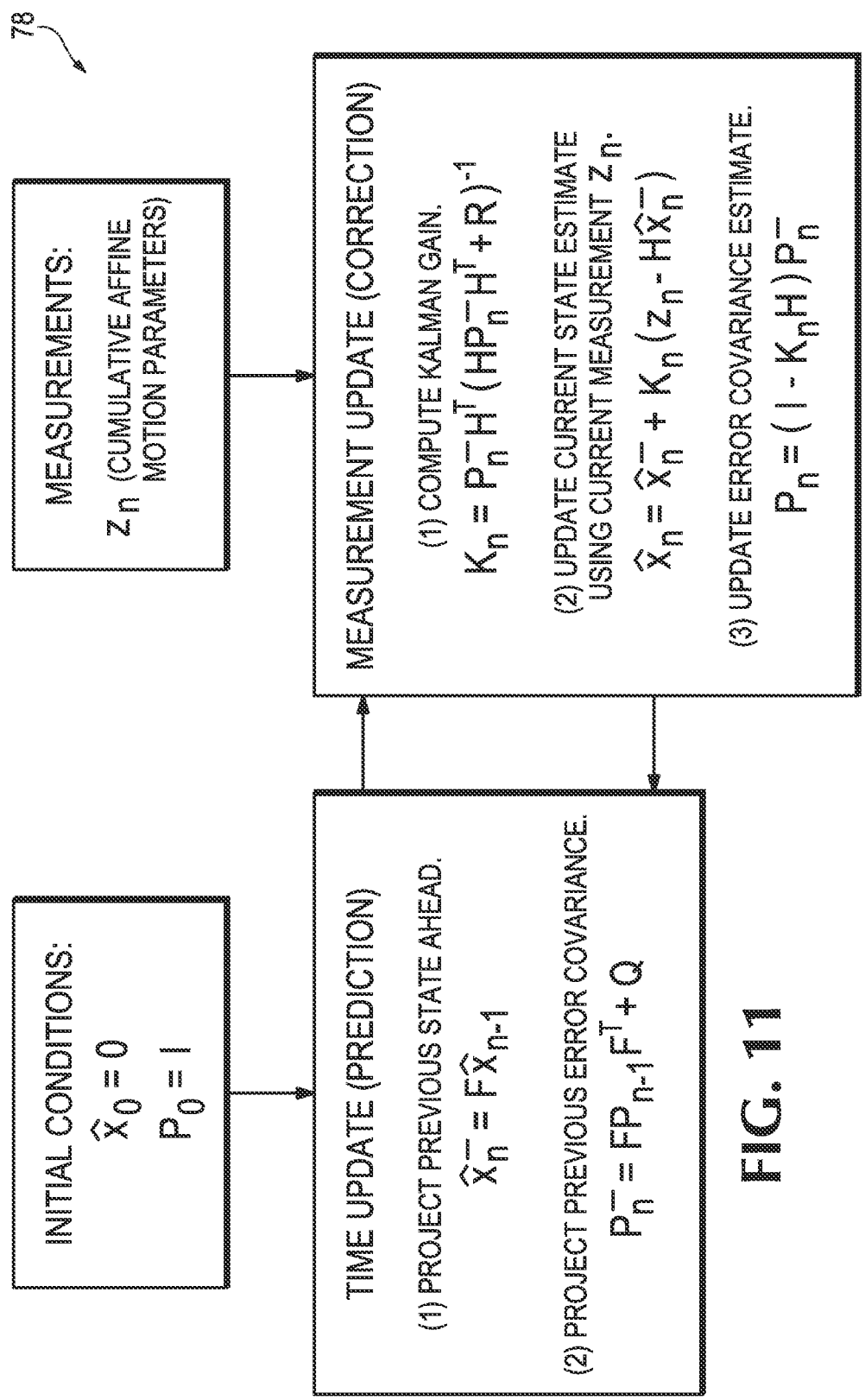
FIG. 11 shows an example of a Kalman filter.

An example of the Kalman filter 78 utilized by module or component 16 is shown in FIG. 11. Kalman filter 78 filters noisy affine motion parameters $z_n$ to generate or determine estimates of intended motion parameters $\hat{x}_n$. Each affine motion parameter is filtered separately.

Covariances R and Q are used to increase or decrease the amount of filtering as well as the inertia in the system. In one application in accordance with the present invention, R is a scalar representing the variance of the cumulative motion parameters. It is common to express R in standard deviation form $\sigma_R$ (the square root of R). As an example for translational motion, values of $\sigma_R$ in a range between one (1) and ten (10) pixels are typical. Low values of $\sigma_R$ increase the influence of the noisy measurements and decrease the filtering accordingly. Similarly, high values of $\sigma_R$ decrease the influence of the noisy measurements and increase the filtering. Also, in the one application in accordance with the present invention referenced above, Q is a diagonal 2×2 matrix with equal entries representing the process variance. As an example for translational motion, values of Q in a range between 0.0001 and 0.1 are typical. Low values of Q force the system to conform to a first order kinematic model (i.e., one of constant velocity or constant motion vectors). Consequently, both filtering and system inertia are increased. High values of Q decrease both filtering and inertia.

Referring again to FIG. 1, image stabilization method 10 proceeds next to motion compensation module or component 18 after completion of motion filtering module or component 16. Motion compensation module or component 18 performs several operations including centering a sub-window on the original frame and rendering a new frame as a warped version of the sub-window to remove the unintended motion component of the determined amount of motion occurring between the original frame and the adjacent frame in the sequence. The size of the sub-window defines a constraint in the allowable amount of correction. Moving this sub-window in a direction opposite the determined estimated motion accomplishes the motion compensation.

Figure 12:
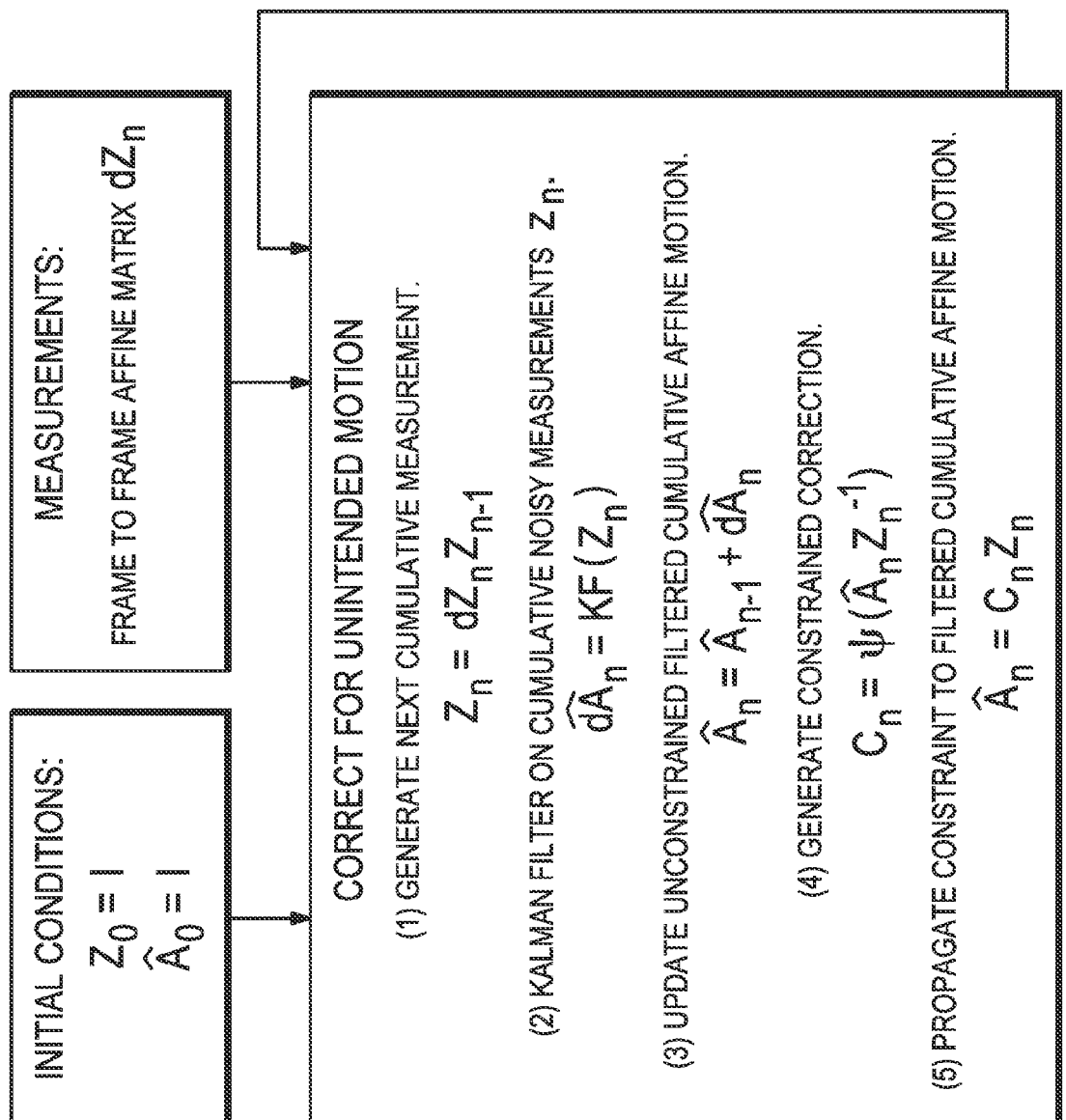
FIG. 12 shows an example of constrained correction of unintended affine motion.

FIG. 12 illustrates an example 80 of this constrained correction of unintended affine motion. In the correct for unintended motion portion 82 of example 80, $KF(Z_n)$ represents the Kalman Filter function operating on the noisy cumulative affine motion parameters $Z_n$ and producing the filtered frame-to-frame affine motion $\widehat{dA}_n$. Additionally, in portion 82 of example 80, $\hat{A}_n Z_n^{-1}$ represents the unconstrained correction affine warp that takes out the original motion $Z_n$ and replaces it with the filtered intended motion $\hat{A}_n$. Further, in portion 82 of example 80, $\psi(\hat{A}_n Z_n^{-1})$ represents a clipping function constraining the affine parameters to avoid warping into undefined regions.

Figure 13:
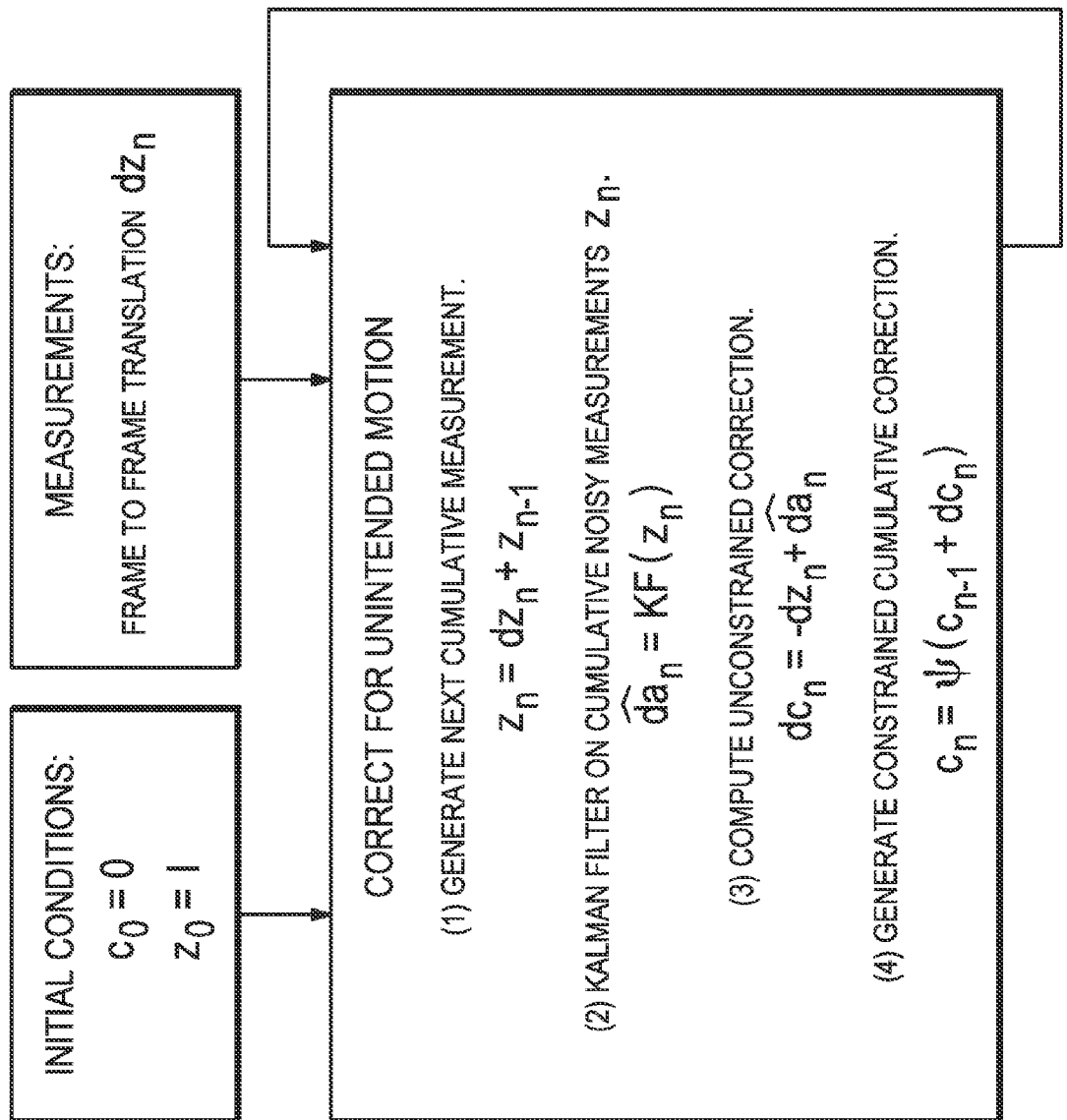
FIG. 13 shows an example of correction for the case of unintended translational motion.

FIG. 13 illustrates an example 84 of simplification of motion compensation module or component 18 for the case of translational motion only. In the correct for unintended motion portion 86 of example 84, $KF(Z_n)$ represents the Kalman Filter function operating on the noisy cumulative affine motion parameters $z_n$ and producing the filtered frame-to-frame affine motion $\widehat{dA}_n$. Additionally, in portion 86 of example 84, $\psi(c_{n-1}+dc_n)$ represents a clipping function constraining the correction to the interval $[c_{min}, c_{max}]$.

One way in which an implementation in accordance with the present invention can utilize Kalman filtering for image stabilization that differs from other implementations is illustrated in step (2) of both FIG. 12 and FIG. 13. That is, filtered frame-to-frame motion parameters are used instead of filtered cumulative motion parameters. It has been empirically determined that this results in better filtering and better system behavior with respect to inertia under sharp motion changes, such as a sudden stop after panning. This choice also leads to an additional innovation in accordance with the present invention illustrated in step (4) of FIG. 12 and FIG. 13, where the cumulative corrections are not allowed to grow unrestrained, but are instead constrained at every iteration of the filter. A more conventional implementation for translational motion would have used $\hat{a}_n = KF(Z_n)$ in step (2) of both FIG. 12 and FIG. 13 and a simpler, but less effective, constrained correction $c_n \psi(-Z_n + \hat{a}_n)$ in step (4) of FIG. 13.

An additional benefit of motion filtering module or component 16 of the present invention relates to the way in which degradations in system behavior during panning motion are addressed. This occurs during times when the system transitions in and out of frames for which motion information cannot be extracted. An example of such a situation where this can occur is panning in and out of scenes lacking features (e.g., a textureless wall). This results in noticeable and undesirable accelerations and decelerations in motion filter output. A solution to this problem for a translational motion case in accordance with the present invention is as follows. First, the global motion vectors are assigned a weight at each iteration of the filter (i.e., at every frame). The default normal value for this weight is one (1). As a frame for which motion cannot be extracted is transitioned into, the last valid known motion vector is used and its value is decreased towards zero (0) by decreasing its weight linearly for every frame as long as true motion information is unavailable. At the same time, the Kalman filter is decreased by halving the measurement noise standard deviation $\sigma_R$ at each frame until the minimum allowable value is reached. Similarly, transition into a frame with available motion information is accomplished by increasing the weight linearly towards one (1) and using this weight on the known value of the global motion vector. At the same time, the Kalman filter is increased by doubling $a_R$ at each frame until the nominal default value is reached.

Figure 14:
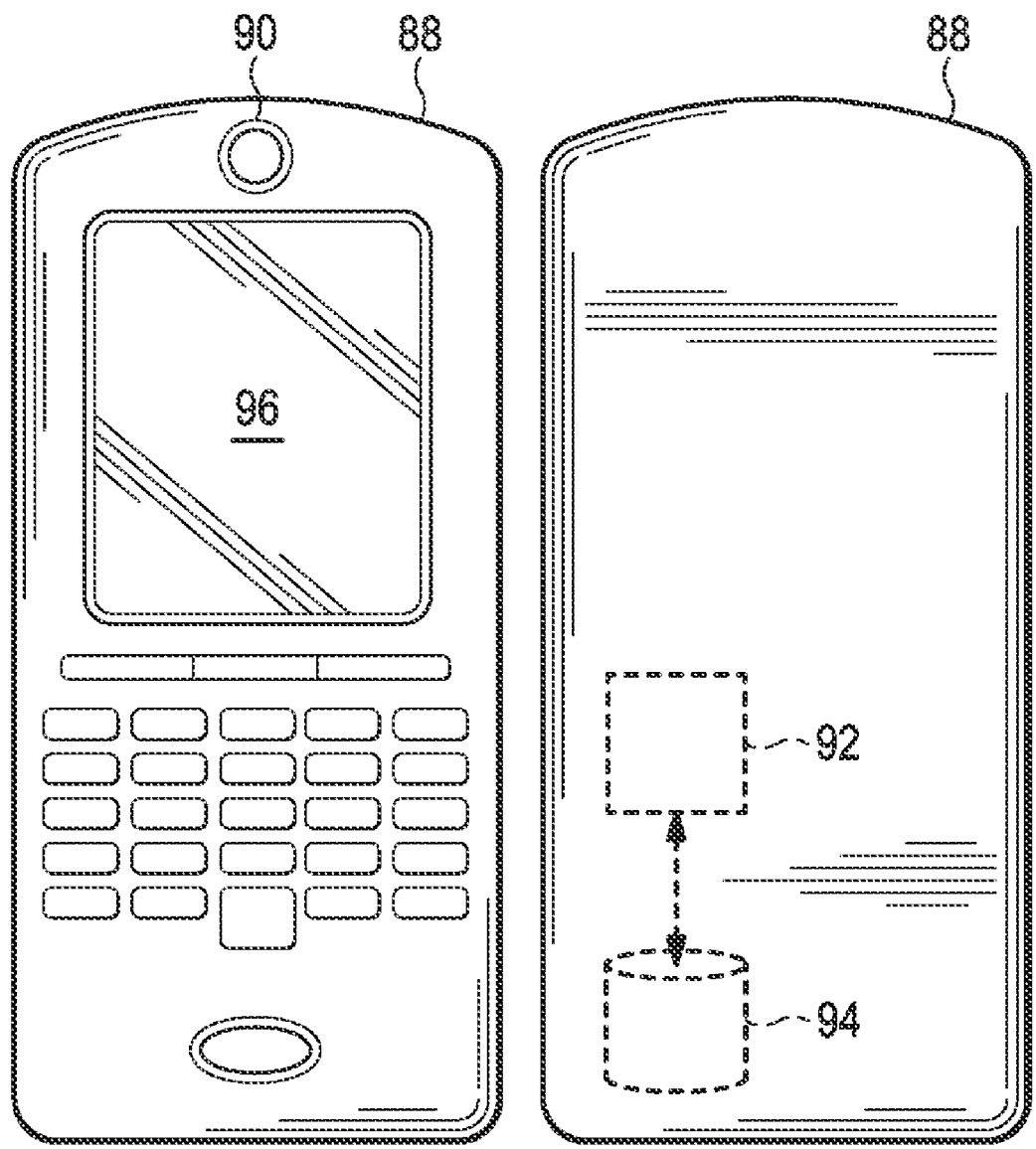
FIG. 14 shows an example of a mobile device.

FIG. 14 shows an example of a mobile device 88 in which the present invention may be utilized. Mobile device 88 includes a camera 90, a processor 92, a non-transitory computer-readable storage medium 94 that stores instructions for stabilizing images captured by camera 90 in accordance with the present invention, and a display screen 96. Although mobile device 88 is a cell phone, other mobile devices such as personal digital assistants, portable computers, cameras, and video recorders may utilize the present invention.

Although several examples have been described and illustrated in detail, it is to be clearly understood that the same are intended by way of illustration and example only. These examples are not intended to be exhaustive or to limit the invention to the precise form or to the exemplary embodiments disclosed. Implementations, modifications and variations may well be apparent to those of ordinary skill in the art. For example, motion compensation module or component 18 can be implemented for the translational case illustrated in FIG. 13 by using a hardware (HW) rotation module found in many mobile devices, such as mobile device 88. As another example, motion compensation module or component 18 can be implemented for the general affine motion case illustrated in FIG. 12 by using the graphics processor unit (GPU) in mobile devices, such as mobile device 88. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A method for image stabilization, comprising:
determining an amount of motion occurring between an original frame and an adjacent frame in a sequence;
analyzing the determined amount of motion occurring between the original frame and the adjacent frame in the sequence;
determining an intended motion component of the determined amount of motion occurring between the original frame and the adjacent frame in the sequence by utilizing filtered frame-to-frame motion parameters rather than filtered cumulative motion parameters;
determining an unintended motion component of the determined amount of motion occurring between the original frame and the adjacent frame in the sequence by utilizing filtered frame-to-frame motion parameters rather than filtered cumulative motion parameters;
centering a sub-window on the original frame; and
rendering a new frame as a warped version of the sub-window based on the determined intended motion component and the determined unintended motion component to remove the unintended motion component of the determined amount of motion occurring between the original frame and the adjacent frame in the sequence.

2. The method for image stabilization of claim 1, further comprising cropping the sub-window centered on the original frame to address undefined areas caused by the rendering of the new frame as a warped version of the sub-window.

3. The method for image stabilization of claim 1, further comprising moving the sub-window in a direction opposite the determined unintended motion component of the determined amount of motion occurring between the original frame and the adjacent frame in the sequence.

4. The method for image stabilization of claim 1, wherein determining the amount of motion occurring between an original frame and the adjacent frame in the sequence includes utilizing feature based image registration.

5. The method for image stabilization of claim 1, wherein the sequence includes a plurality of video frames.

6. The method for image stabilization of claim 1, wherein determining the unintended motion component of the determined amount of motion occurring between the original frame and the adjacent frame in the sequence includes calculating a difference between the determined amount of motion occurring between the original frame and the adjacent frame in the sequence and the determined intended motion component of the determined amount of motion occurring between the original frame and the adjacent frame in the sequence.

7. The method for image stabilization of claim 1, wherein determining the unintended motion component of the determined amount of motion occurring between the original frame and the adjacent frame in the sequence includes creating and utilizing a first order kinematic model for Kalman filtering of cumulative affine motion parameters.

8. The method of image stabilization of claim 1, wherein rendering a new frame as a warped version of the sub-window to remove the unintended motion component of the determined amount of motion occurring between the original frame and the adjacent frame in the sequence includes performing an affine warping.

9. The method for image stabilization of claim 1, in a mobile device.

10. A non-transitory computer-readable storage medium storing instructions for image stabilization that, when executed by a processor, cause the processor to:
determine an amount of motion occurring between an original frame and an adjacent frame in a sequence;
analyze the determined amount of motion occurring between the original frame and the adjacent frame in the sequence;
determine an intended motion component of the determined amount of motion occurring between the original frame and the adjacent frame in the sequence by utilizing filtered frame-to-frame motion parameters rather than filtered cumulative motion parameters;
determine an unintended motion component of the determined amount of motion occurring between the original frame and the adjacent frame in the sequence by utilizing filtered frame-to-frame motion parameters rather than filtered cumulative motion parameters;
center a sub-window on the original frame; and
render a new frame as a warped version of the sub-window based on the determined intended motion component and the determine unintended motion component to remove the unintended motion component of the determined amount of motion occurring between the original frame and the adjacent frame in the sequence.

11. The non-transitory computer-readable storage medium of claim 10, further comprising storing instructions for image stabilization that, when executed by a processor, cause the processor to crop the sub-window centered on the original frame to address undefined areas caused by to the rendering of the new frame as a warped version of the sub-window.

12. The non-transitory computer-readable storage medium of claim 10, further comprising storing instructions for image stabilization that, when executed by a processor, cause the processor move the sub-window in a direction opposite the determined unintended motion component of the determined amount of motion occurring between the original frame and the adjacent frame in the sequence.

13. The non-transitory computer-readable storage medium of claim 10, wherein feature based image registration is utilized by the processor to determine the amount of motion occurring between an original frame and the adjacent frame in the sequence.

14. The non-transitory computer-readable storage medium of claim 10, wherein the sequence includes a plurality of video frames.

15. The non-transitory computer-readable storage medium of claim 10, wherein the processor calculates a difference between the determined amount of motion occurring between the original frame and the adjacent frame in the sequence and the determined intended motion component of the determined amount of motion occurring between the original frame and the adjacent frame in the sequence to determine the unintended motion component of the determined amount of motion occurring between the original frame and the adjacent frame in the sequence.

16. The non-transitory computer-readable storage medium of claim 10, wherein the processor creates and utilizes a first order kinematic model for Kalman filtering of cumulative affine motion parameters to determine the unintended motion component of the determined amount of motion occurring between the original frame and the adjacent frame in the sequence.

17. The non-transitory computer-readable storage medium of claim 10, wherein the processor performs an affine warping to render a new frame as a warped version of the sub-window to remove the unintended motion component of the determined amount of motion occurring between the original frame and the adjacent frame in the sequence.

18. The non-transitory computer-readable storage medium of claim 10, in a mobile device including the processor.

19. A mobile device having image stabilization, comprising:
   a processor;
   a camera; and
   a non-transitory computer-readable storage medium storing instructions for image stabilization that are executed by the processor to determine an amount of motion occurring between an original frame and an adjacent frame in a sequence, analyze the determined amount of motion occurring between the original frame and the adjacent frame in the sequence, determine an intended motion component of the determined amount of motion occurring between the original frame and the adjacent frame in the sequence by utilizing filtered frame-to-frame motion parameters rather than filtered cumulative motion parameters, determine an unintended motion component of the determined amount of motion occurring between the original frame and the adjacent frame in the sequence by utilizing filtered frame-to-frame motion parameters rather than filtered cumulative motion parameters, center a sub-window on the or frame, and render a new frame as a warped version of the sub-window based on the determined intended motion component and the determined unintended motion component to remove the unintended motion component of the determined amount of motion occurring between the original frame and the adjacent frame in the sequence.

20. The mobile device of claim 19, wherein the sequence includes a plurality of video frames.

* * * * *

UNITED STATES PATENT AND TRADEMARK OFFICE
CERTIFICATE OF CORRECTION

PATENT NO. : 8,385,732 B2  
APPLICATION NO. : 13/194027  
DATED : February 26, 2013  
INVENTOR(S) : Oscar Zuniga et al.

Page 1 of 1

It is certified that error appears in the above-identified patent and that said Letters Patent is hereby corrected as shown below:

In the Claims

In column 9, line 60, in Claim 8, delete "method of" and insert -- method for --, therefor.

In column 10, line 22, in Claim 10, delete "determine" and insert -- determined --, therefor.

In column 10, line 35, in Claim 12, delete "processor" and insert -- processor to --, therefor.

In column 12, line 8, in Claim 19, delete "or" and insert -- original --, therefor.

Signed and Sealed this  
Fourth Day of June, 2013

Teresa Stanek Rea  
*Acting Director of the United States Patent and Trademark Office*